United States Patent [19]

Dahl

[11] Patent Number: 4,832,195

[45] Date of Patent: May 23, 1989

[54] COMPACT STORAGE FILES

[76] Inventor: Ernest A. Dahl, 5419 E. Lake Shore Dr., Wonder Lake, Ill. 60097

[21] Appl. No.: 189,064

[22] Filed: May 2, 1988

[51] Int. Cl.[4] .......................................... B65D 85/672
[52] U.S. Cl. ..................................... 206/387; 211/40; 312/9; 312/11
[58] Field of Search ............... 206/307, 309, 387, 444; 211/40, 41, 163; 312/8-9

[56] References Cited

U.S. PATENT DOCUMENTS

| | | | |
|---|---|---|---|
| 1,192,299 | 7/1916 | Goebel | 211/40 |
| 1,508,610 | 9/1924 | O'Connor | 312/10 |
| 3,737,046 | 6/1973 | Jeter | 312/10 |
| 4,270,817 | 6/1981 | McRae | 206/387 |
| 4,577,914 | 3/1986 | Stravitz | 206/387 |
| 4,600,107 | 7/1986 | Price et al. | 312/8 |
| 4,620,740 | 11/1986 | Kinzig | 312/10 |
| 4,630,737 | 12/1986 | King | 211/40 |
| 4,715,669 | 12/1987 | Baillie et al. | 211/40 |
| 4,720,153 | 1/1988 | Hatcher | 312/9 |
| 4,730,735 | 3/1988 | Lechner | |

FOREIGN PATENT DOCUMENTS

| | | | |
|---|---|---|---|
| 0207237 | 1/1987 | European Pat. Off. | 206/387 |
| 2132075 | 7/1984 | United Kingdom | 312/8 |

Primary Examiner—Jimmy G. Foster
Attorney, Agent, or Firm—Edward L. Benno

[57] ABSTRACT

A compact storage file for box-like objects such as the IBM 3480 magnetic tape cartridge. The basic file unit comprises a U-shaped frame of a flat back wall and integral side walls with a plurality of shelves therein. The construction of the basic unit enables it to be replicated and arranged in many different multiples of the basic unit for efficient use of space in large or complex computer facilities. The shelves in the units are vertically spaced close together for the compact storage of the cartridges and arranged to provide for convenient hand removal of the cartridges from the file. Only the shelves of the storage file units are provided with cartridge separating walls which are constructed and arranged so that a grasped group of the IBM 3480 cartridges are easily quickly inserted as a group in any open area of the file unit.

11 Claims, 3 Drawing Sheets

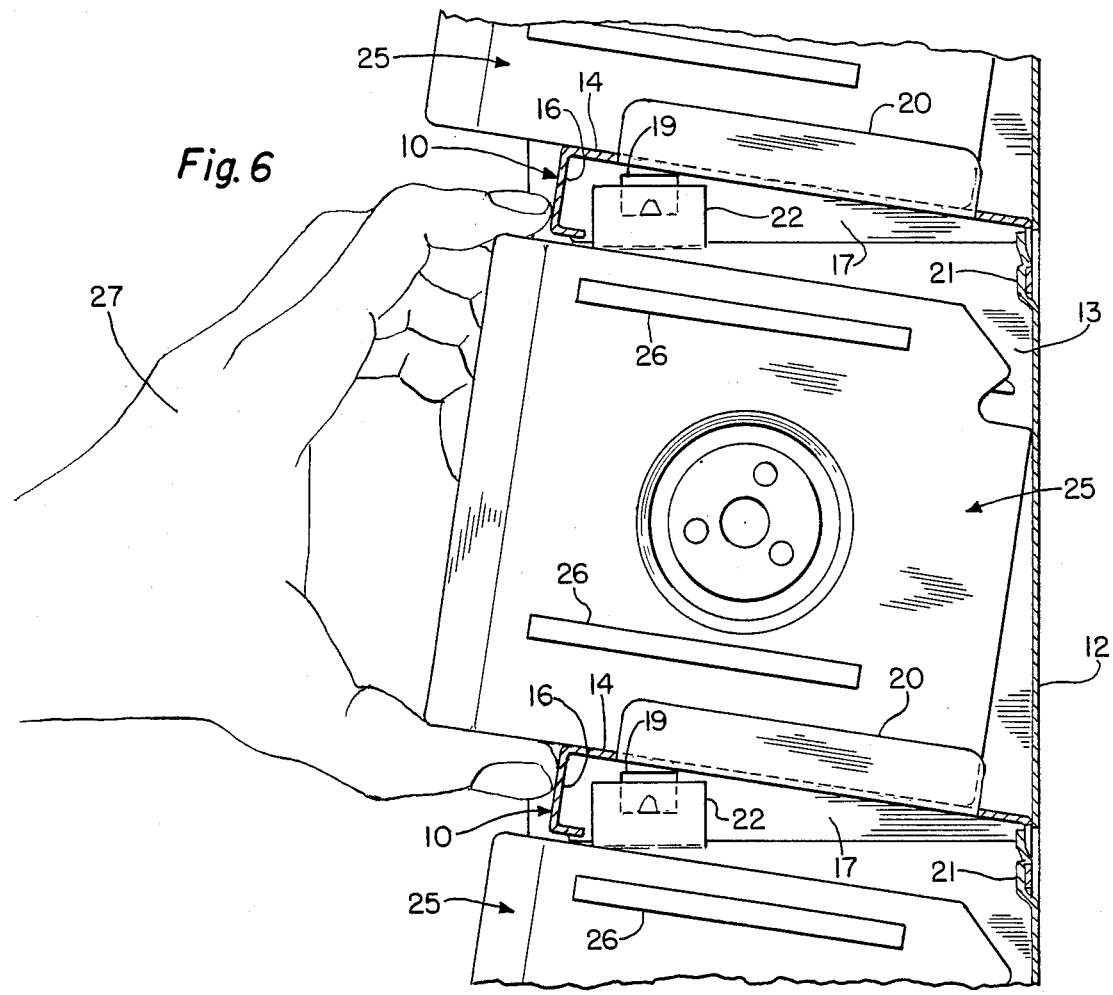
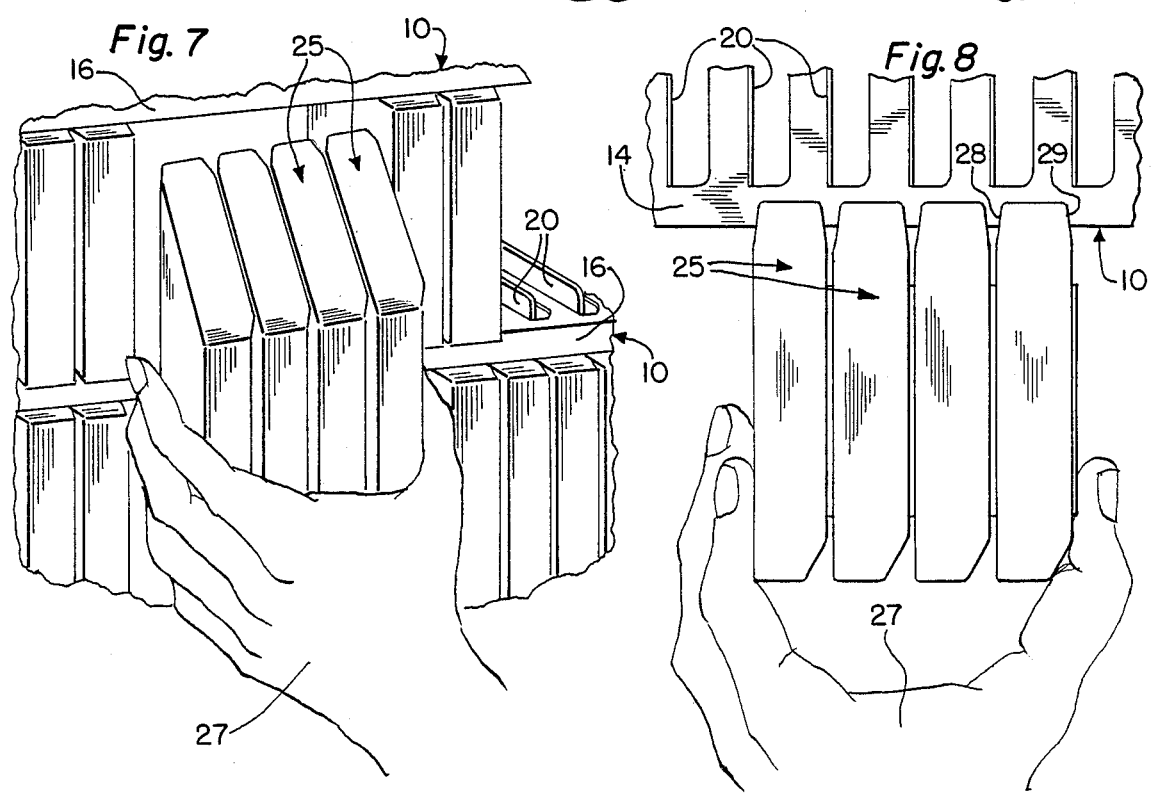

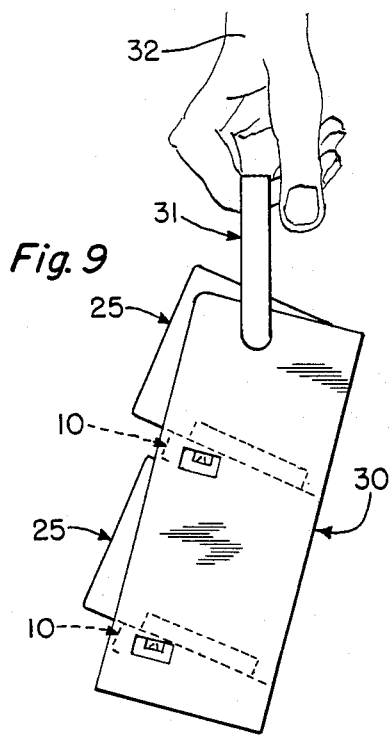
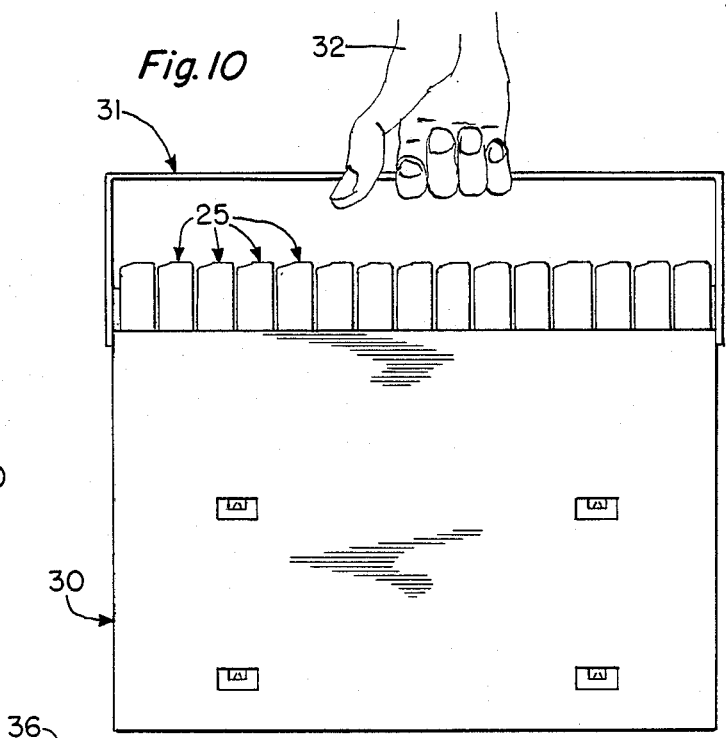
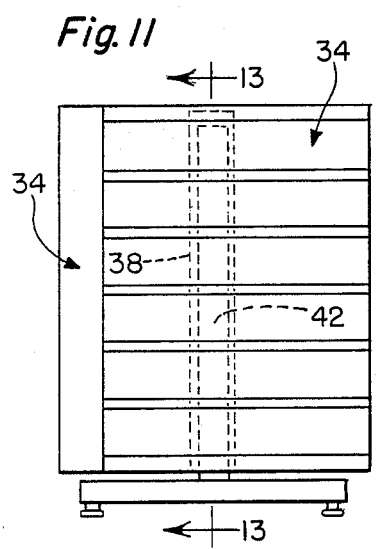
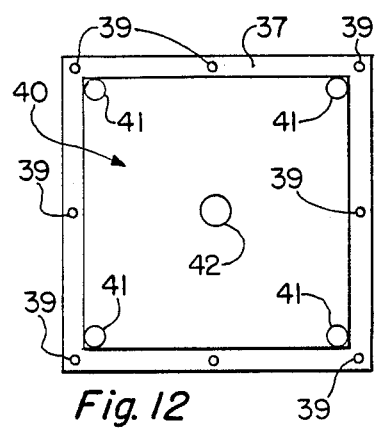
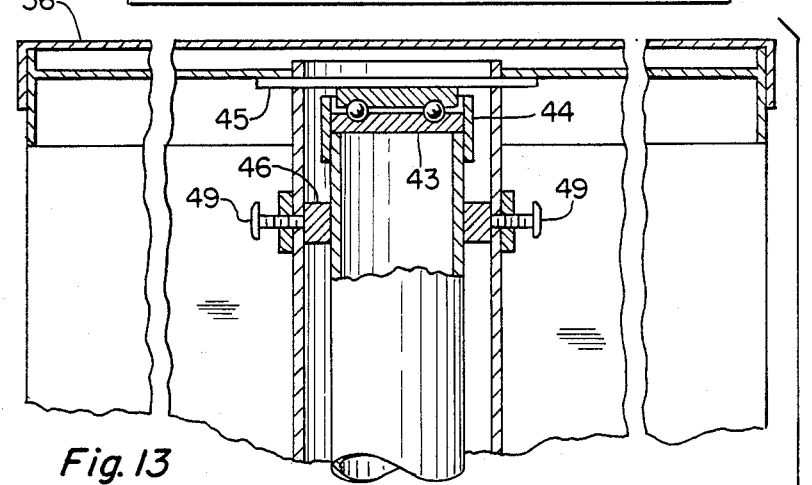
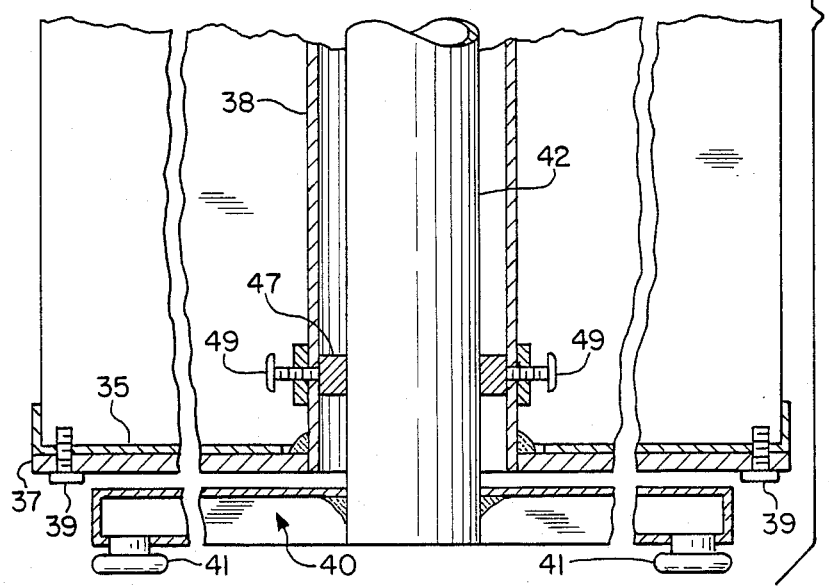

COMPACT STORAGE FILES

BACKGROUND OF THE INVENTION

The subject invention is related to that area of the prior art where storage files are provided for storing box-like objects such as the IBM 3480 magnetic tape cartridge. Such cartridges must be stored in the most compact arrangements possible because of the great numbers of those cartridges that are required in many commercial computer operations. Because such cartridges are often repeatedly used on a regular basis, quick and easy cartridge removal from and replacement in the files are necessary features in the construction and arrangement of the file. U.S. Pat. No. 4,720,153 shows one type of storage file in this prior art area.

SUMMARY OF THE INVENTION

The subject invention is an improvement over known prior art storage files primarily in the construction that renders files made according to the invention substantially more compact and more easily used in the removal and replacement operations of cartridges in the file.

The subject invention comprises a basic storage file unit that can be used as such or that can be replicated and combined in various larger convenient library-type arrangements.

The basic storage file unit comprises a frame with a plurality of shelves secured therein. The frame is simply formed as a flat back wall with integral side walls by bending a rectangular sheet of a thin metal material into a U-shape. The plurality of shelves are identical to each other and are each formed by bending a rectangular sheet of a thin metal material into a cartridge supporting surface with depending rear, front and end or side walls. Short cartridge separating walls are formed to upstand from the cartridge supporting surface by shearing the separating walls from the supporting surface and bending them to upright positions.

The shelves are secured between and to the side walls of the frame and to the back wall of the frame so that the shelves are in a vertically stacked and parallel spaced apart arrangement. The spacing between the cartridge supporting surface of one shelf and the lower marginal edge of the front wall of the shelf immediately thereabove is no more than the height of one of the cartridges plus such a clearance amount as is necessary to prevent binding of a cartridge inserted between the shelves. Also, the shelves are disposed rearwardly and downwardly at an angle of no more than ten degrees. Additionally, the height of each shelf front wall is no greater than the thickness of the average person's index finger, and the depth of each shelf is substantially less than the depth of a cartridge so that a person may conveniently use his index finger and thumb of one hand to draw a cartridge from a storage file which is full of cartridges.

The IBM 3480 cartridge is formed so that side-by-side cartridges will interlock against relative sliding movement when grasped in groups, and is also formed with at least the lower side wall portions on each cartridge being tapered to to converge toward the rear of the cartridge. That arrangement permits a person holding a group of cartridges together to easily and quickly insert the entire group at one time in an open area on a shelf of a storage file constructed according to the present invention.

The primary object of the present invention is to provide a storage file for box-like objects such as the IBM 3480 magnetic tape cartridge in which a substantially greater number of cartridges can be stored than in prior art files of the same over all size, and in which the individual cartridges can be easily removed from the file and groups of such cartridges may easily be inserted as a group into the file.

Other objects and features of the invention will be apparent upon a perusal of the hereinafter following detailed description read in conjunction with the drawings.

DESCRIPTION OF THE DRAWINGS

FIG. 6 is an enlarged cross sectional and fragmentary view of the structure of FIGS. 1-5 with IBM 3480 magnetic tape cartridges inserted in the file to show the manner of removal of an individual cartridge;

FIG. 7 is a fragmentary isometric view of the storage file of FIGS. 1-6 showing the manner of inserting a grasped group of the IBM 3480 cartridges in the file;

FIG. 8 is a top plan view of the showing of FIG. 7 to show the file construction and arrangement of the present invention and cooperation with a group of IBM 3480 cartridges in a group cartridge insertion operation;

FIG. 9 is a side or end elevational view of another embodiment of a storage file of the present invention;

FIG. 10 is a back elevational view of the structure of FIG. 9;

FIG. 11 is a front elevational view of another embodiment of a storage file of the present invention;

FIG. 12 is a bottom plan view of the structure of FIG. 11; and

FIG. 13 is an enlarged cross sectional view of the structure of FIGS. 11 and 12 and taken substantially along the line 13—13 of FIG. 12.

DETAILED DESCRIPTION OF THE INVENTION

The preferred embodiment shown in FIGS. 1-8 is a basic storage file unit of the subject invention. In that embodiment a unit comprises three identical shelves 10 and a frame 11.

The frame 11 is formed from a thin rigid sheet material such as steel. A rectangular sheet of that material is bent into a U-shaped frame of a flat back wall 12 and integral opposed side walls 13. To provide a larger area of support for the frame in its normal upstanding position on some surface, the lower marginal edge portions of the back wall 12 and side walls 13 are bent perpendicularly to those walls as may be seen in FIGS. 1 and 2.

Figure 4:
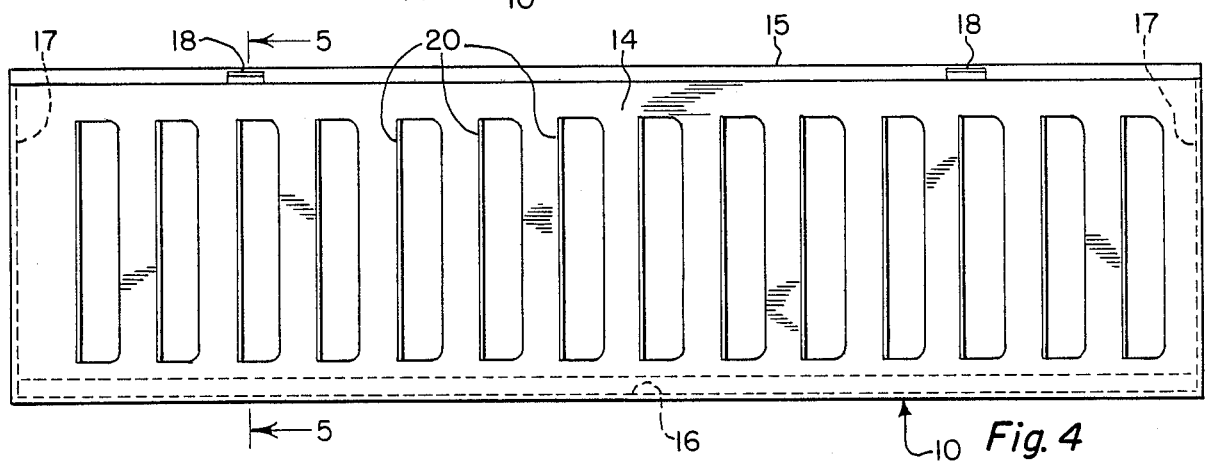
FIG. 4 is an enlarged top plan view of a shelf removed from the structure of FIGS. 1-3.
Figure 5:
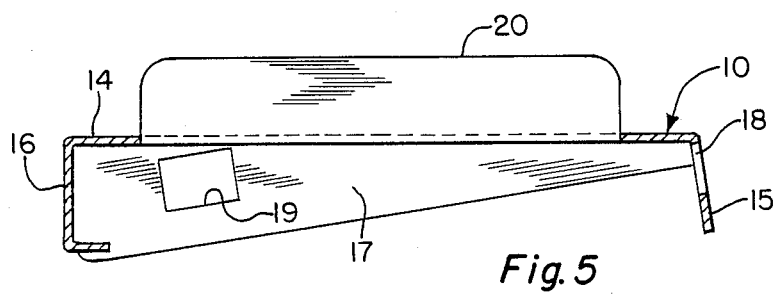
FIG. 5 is a cross sectional view of the shelf of FIG. 4 taken substantially along the line 5—5 of FIG. 4.

Each of the shelves 10 is also formed from a rectangular sheet of material such as a thin sheet steel material. In FIGS. 4 and 5 the shelf 10 is shown to comprise a rectangular cartridge supporting surface 14, a rear wall 15, a front wall 16, and two opposed side walls 17. In a preferred embodiment the rear wall depends from the supporting surface 14 at an angle rearwardly outwardly from a perpendicular line to said supporting surface 14 with that angle being between zero and ten degrees as may be seen in FIG. 5. The rear wall 15 is provided with two spaced apart rectangular openings 18 for locking the rear wall 15 to the rear wall 12 of the frame 11 in a manner to be described.

The front wall 16 of a shelf 10 is bent downwardly at substantially a right angle to the supporting surface 14. The lower marginal edge portion of the front wall 16 is bent inwardly toward the rear wall 15 of the shelf. In a preferred embodiment the front wall 16 has a height substantially that of the thickness of the average person's index finger.

In a preferred embodiment the side walls 17 are bent downwardly at substantially a right angle to the supporting surface 14. Each side wall 17 is provided with a small rectangular opening 19 as may be seen in FIG. 5. The opening 19 cooperates with the side walls 13 of the frame 11 in a manner to be described.

The cartridge supporting surface 14 of each shelf 10 is provided with a plurality of parallel spaced apart and upstanding cartridge supporting walls 20. The spacing between walls 20 is slightly greater than the thickness of the box-like object or cartridge intended to be stored in the file. The separating walls 20 are made by cutting or shearing them from the supporting surface 14. The separating walls 20 have a height less than the distance or spacing between adjacent walls 20.

Figure 1:
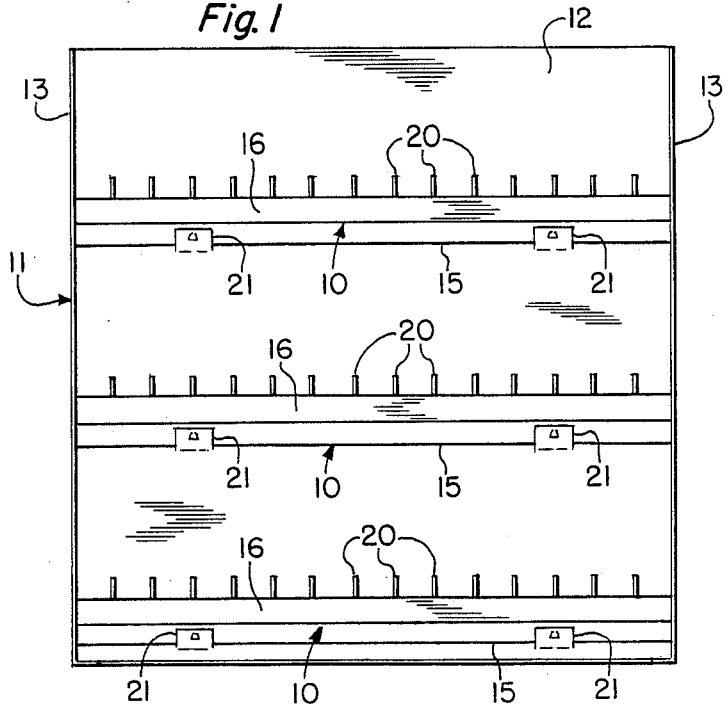
FIG. 1 is a front elevational view of a basic storage file unit constructed according to the invention.
Figure 3:
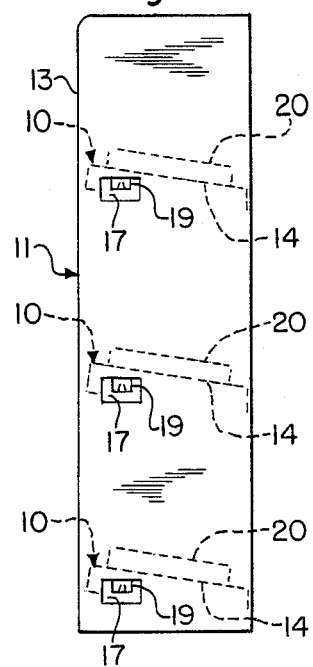
FIG. 3 is a side or end elevational view of the structure of FIGS. 1 and 2.

The means for securing or locking the shelves 10 to the rear wall 12 and side walls 13 of the frame 11 comprises in addition to the above described rectangular openings 18 of the back wall 15 and 19 of the side walls 17 a number of tongues or flanges 21 and 22. In the embodiment of FIGS. 1-5, six tongues 21 are cut or otherwise sheared from the back wall 12 of the frame 11. Those six tongues 21 can be seen in the front view of the storage file in FIG. 1. As those tongues 21 are sheared from the material of the back wall 12 of the frame 11 they are projected or positioned immediately adjacent to the inner surface of the back wall 12. Also, the lower edge of each tongue 21 is integral with the back wall 12 of the frame 11. Each tongue 21 is further provided with a small detent or stop. Those detents are unnumbered in the drawings but can be clearly seen in FIG. 1 approximately in the center of each tongue 21. Those detents are formed to extend outwardly of the surface of each tongue 21 in a direction toward or into the plane of the back wall 12 of the frame 11. The tongues 21 are positioned on the back wall 12 of the frame 11 so that when the back walls 15 of the shelves 10 are pushed downwardly between the tongues 21 and the inner surface of the back wall 12 of the frame 11 the back walls 15 of the shelves 10 are aligned in parallel spaced apart relationships as can be seen in FIGS. 1 and 3. The rectangular openings 18 of the back walls 15 of the shelves 10 are positioned on the back walls 15 so that when the back walls 15 are pushed downwardly between the tongues 21 and the inner surface of the back wall 12 of the frame 10 the openings 18 are over the outwardly projecting detents of the tongues 21. As the detents project within the openings 18 the lower edge of each detent engages the lower edge of an opening 18 to lock or secure the back walls 15 of the shelves 10 to the frame 11.

In the embodiment of FIGS. 1-5, three tongues 22 are cut or sheared from each side wall 13 of the frame 11.

Figure 2:
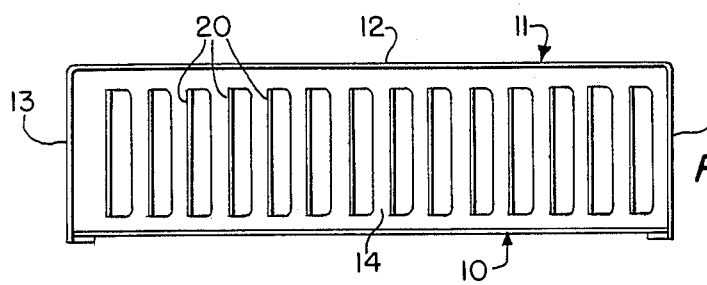
FIG. 2 is a top plan view of the structure shown in FIG. 1.

The tongues 22 are not easily seen in FIGS. 1-3, but are shown in FIG. 6. As described relative to tongues 21, the tongues 22 are disposed immediately adjacent the inner surface of the side walls 13 of the frame 11. Thus they appear in FIG. 6 where the inner surface of one side wall 13 is partially shown, but do not fully appear in FIG. 3. In FIG. 3 one sees the large rectangular openings in the side wall 13 from which the tongue 22 has been sheared. The major portions of those tongues 22 are covered in FIG. 3 by the side walls 17 of the shelves 10. A small portion of each tongue 22 can be seen in FIG. 3 within the small rectangular openings 19 of the side walls 17 of the shelves 10. The small portion of each tongue 22 which may be seen in FIG. 3 includes an unnumbered detent which as described relative to the securing of the back walls 15 of the shelves 10 secures or locks the side wall 17 of a shelf 10 to a side wall 13 of the frame 11. The tongues 22 can not be adequately shown in FIGS. 1 and 2 because of their relatively small size and that they are hidden by the front walls 16 and virtually with the plane of the side walls 13. In a preferred embodiment the tongues 22 are positioned on the side walls 13 so that the shelves 10 are locked in positions such as shown in the dotted lines of FIG. 3 where the cartridge supporting surfaces 14 extend at an angle from the horizontal downwardly and rearwardly toward the back wall 12 of the frame 11. In FIG. 3 that angle is about nine degrees, but the invention contemplates that it may be at other angles in the range of from zero degrees to ten degrees.

When a storage file such as that described relative to FIGS. 1-5 is combined or intended for use with the IBM 3480 magnetic tape cartridge the cooperation or combination in construction and use is as may be described relative to FIGS. 6-8. Those cartridges are shown at 25 and may be described as generally rectilinear. As here pertinent the cartridges 25 have slightly raised ribs 26 on one face thereof. The opposite face of each cartridge is provided with a shallow depression (not shown) such that when two or more cartridges 25 are grasped together in a group as shown by the person's hand 27 in FIGS. 7 and 8 the ribs 26 and depressions of adjacent cartridges will interact to substantially prevent relative sliding movement between the cartridges in the group.

Further as here pertinent, at least the lower rear face portions of each cartridge 25 converge toward each other. That convergence can be seen at 28 and 29 in FIG. 8. In a grasped group of cartridges 25 that convergence can be described as forming rearwardly opening or diverging V-shaped slots between adjacent cartridges 25.

In a storage file of the invention intended for storing the IBM 3480 cartridges, the vertical spacing between shelves 10 is substantially equal to the height of a cartridge 25 plus a clearance space to avoid binding of a cartridge inserted between two shelves 10 as may be seen in FIG. 6. Further, the depth of the shelves 10 or the front-to-back dimension of the cartridge supporting surface 14 is less than the depth or front-to-back dimension of a cartridge 25 by an amount such that when a cartridge 25 is on the supporting surface 14 of a shelf 10 and with the back or rear wall of the cartridge 25 engaging the rear wall 12 of the frame 11 a sufficient portion of the upper forward wall portion of a cartridge is exposed to receive the index finger of the hand 27 of a person as shown in FIG. 6. Also in the instant embodiment, the spacing between separating walls 20 is greater than the thickness of a cartridge 25, and the height of the walls 20 is less than the distance between the lower rib 26 of a cartridge 25 and the bottom thereof. Additionally in the instant embodiment, the distance between the forward upstanding edge of each cartridge separating wall 20 and the forward edge of the cartridge supporting surface 14 is equal to or less than the depth of the described V-shaped slots between adjacent cartridges in a grasped group as may be seen in FIG. 8.

Reductions to practice of the invention have established that the above defined construction details of a storage file intended for use with the IBM 3480 cartridges produce a number of unexpected advantages and results. One feature is that more shelves can be stacked in any given sized file than in previously known files with hand admission to individual cartridges for easy removal thereof. FIG. 6 shows this feature particularly in showing the easy cartridge removal operation from an area where adjacent cartridges 25 are to each side of and above and below the cartridge to be removed. Another feature is that a grasped group of cartridges 25 can be easily and quickly placed in a group into an open area of the file. This feature is shown in FIGS. 7 and 8. Because the only possible obstructions to the group of cartridges 25 are the separating walls 20, and because of their size, spacing and location relative to the V-shaped slots of the cartridges 25, the group is easily inserted without having to be held in substantially perfect horizontal, vertical and linear alignment relative to the shelves. This feature has only become readily apparent after a number of reductions to practice and use in computer operating facilities where the number of cartridges 25 are great and are repeatedly used on a regular basis of rather short intervals of removal from and replacement in the storage files.

Before turning to a detail description of the embodiments of FIGS. 9-13, further contemplated embodiments of the basic unit described relative to FIGS. 1-8 should be noted. The invention contemplates that two basic units can be secured back-to-back for a double sided unit. Also, two basic units can be secured side-by-side. Thus it may be seen that large library assemblies can be made by any selected combination of back-to-back and side-by-side units. Further, it should be understood that a basic unit need not be limited to three shelves as in the described basic unit of FIGS. 1-8. By vertically extending the frame 11, more than three shelves may be provided in a unit.

FIGS. 9 and 10 show a revision of the previously described basic unit into a portable unit of two shelves 10 for carrying two rows of cartridges 25. The frame 30 is formed as described for frame 11 of the embodiment of FIGS. 1-8 but of a shorter vertical height. The shelves 10 are identical to the previously described shelves 10 and are secured in the frame 30 as previously described for the other embodiments.

The embodiment of FIGS. 9 and 10 further includes a handle 31. The handle 31 is shaped as a U-shaped bail member. The legs of the handle 31 are spaced apart a distance substantially that of the side walls of the frame 30 and are secured thereto as by welding. Thus the handle 31 is in a fixed condition relative to the frame 30. Although not apparent in the drawings, the cross member of the handle 31 is concave on the upper side and convex on the underside to render it substantially rigid longitudinally thereof. The legs of the handle 31 are further secured to the side walls of the frame 30 to position the cross member above and adjacent to the front side of the frame 30 so that when the storage file with the cartridges therein is suspended from the hand 32 of a person, the front face of the file is disposed slightly downwardly and outwardly as shown in FIG. 9.

The embodiment of FIGS. 11-13 shows four basic storage units constructed according to the invention as previously described and with each of the four units having a substantial number of shelves. As shown in FIG. 11, six shelves are provided in each unit. Many of the previously described details are omitted in FIGS. 11-13 to clearly show the rotatable feature of the embodiment.

The four storage files 34 are arranged in a rectangular pattern on a rectangular pan 35. In a preferred embodiment, the pan 35 is formed from a thin sheet metal with an upstanding edge or flange on the periphery thereof and with a large hole in the center thereof. The file units 34 are secured to the pan 35 by any known fastening means (not shown). The four storage file units 34 may further be provided with a cover 36 secured thereon by any known fastening means (not shown).

The embodiment of FIGS. 11-13 further comprises a rectangular substantially rigid plate 37 of a size substantially that of the pan 35. A tube 38 is secured as by welding through the center of the plate 37 to upstand therefrom. The four storage file units 34 and the pan 35 are mounted over the tube 38 and on the plate 37. Fasteners 39 through the plate 37 secure the plate 37 to the pan 35.

The embodiment of FIGS. 11-13 further comprises a base member 40. The base member 40 is rectangular and slightly smaller than plate 37. The underside of base member 40 is provided with four legs 41, and at the center thereof an upstanding tube or rod-like member 42 is secured as by welding.

The outer diameter of tube 42 is less than the inner diameter of tube 38, and the assembly of the file units 34, the pan 35, the plate 37 and the tube 38 is telescopically mounted over tube 42. As can be seen in FIG. 13, that assembly is carried with plate 37 spaced above base member 40, and that spacing is a result of the vertical position of a thrust bearing 43. To support the thrust bearing 43, a short sleeve 44 is secured about the upper end of tube 42 as by welding with a small incremental length of sleeve 44 extending above the upper end of tube 42. Thrust bearing 43 is mounted in the upper end of sleeve 44 with the lower race of the bearing resting upon the upper end of tube 42. The upper race of the bearing 43 has an outer diameter less than the inner diameter of sleeve 44 and the upper surface of that upper race extends above the upper end of sleeve 44. A pin 45 is mounted diametrically through the upper end of tube 38 and rests upon the upper surface of the upper race of thrust bearing 43 to thereby rotatively carry the file units 34 on and slightly spaced above the base member 40. The subject embodiment further includes sleeve bearings 46 and 47. Sleeve bearing 47 is mounted within tube 38 and about tube 42 as a journal near the lower end thereof. Sleeve bearing 47 is secured to tube 38 by fasteners 49 threaded through tube 38. In a like manner, sleeve bearing 46 is mounted within the upper end of tube 38 by fasteners 49 and tube 42 is carried in sleeve bearing 46 as a journal. In reductions to practice of the embodiment of FIGS. 11-13 it has been found that the file units 34, even when fully loaded with cartridges, appeared unexpectedly stable as the units were rotated by a person seeking or replacing certain cartridges.

That unexpected stability was also present when another set of four storage file units 34 was mounted on top of the embodiment of FIGS. 11-13. It was found that the stability of the rotatable units made persons who used the file comfortable, and with the features of the individual storage files as previously described, such persons could work comfortably, quickly and easily in continuing operations of cartridge removal and insertion.

Having described the invention it is to be understood that changes can be made in the described embodiments by a person skilled in the art within the spirit and scope of the hereinafter following claims.

I claim:

1. In combination, a plurality of magnetic tape cartridges such as the IBM 3480 cartridge and a storage file for compactly storing said cartridges in upright rows of generally side-by-side engagement and in a vertical stack of a plurality of said rows, said storage file comprising a frame of a sheet of relatively thin rigid material formed as a rectilinear flat back wall devoid of any substantial projections on either side thereof with a pair of integral opposed rectangular side walls extending perpendicularly from the opposite vertical edges of said back wall, a plurality of substantially identical shelves for supporting said cartridges in said upright rows of generally side-by-side engagement, each of said shelves being formed from a rectangular sheet of relatively thin rigid material as a rectangular cartridge supporting surface with a plurality of upstanding substantially parallel cartridge separating walls integral with said rectangular supporting surface with the underside of said rectangular supporting surface within the periphery thereof being devoid of any downwardly projecting cartridge separating walls, said separating walls arranged transversely of said rectangular cartridge supporting surface and spaced apart a distance slightly greater than the thickness of said cartridges to provide a loose fit of said cartridges between adjacent separating walls, said plurality of shelves being secured to and between said side walls and said back wall of said frame in a parallel vertically spaced apart relationship sufficient to admit said cartridges in upright conditions on said cartridge supporting surfaces and between said separating walls and absent any engagement of any shelf thereabove, said plurality of cartridges being disposed upon said cartridge supporting surfaces and between said separating walls of said shelves in upright rows of generally side-by-side engagement and in a vertical stack of said rows, each of said cartridges being formed with the adjacent faces which are in side-by-side engagement having interlocking means for enabling two or more cartridges to interlock against sliding relative to one another upon being grasped and held together by a person's hand, said separating walls having a height terminating below said interlocking means of said adjacent faces of said cartridges, each of said cartridges further being formed with the adjacent faces which are in side-by-side engagement as generally rearwardly and horizontally opening V-shaped slots defined by said adjacent faces at the lower rearward edge portions thereof within said shelves, said slots having a vertical height greater than said height of said separating walls and an opening dimension greater than the thickness of said separating walls whereby a grasped group of said cartridges is easily inserted as a unit in any open area of said storage file.

2. In the combination as defined in claim 1, and a handle for conveniently carrying said storage file with said cartridges disposed therein on said cartridge supporting surfaces, said handle being formed as a substantially rigid U-shaped member of a pair of spaced apart legs interconnected by a cross member, said legs spaced apart a distance substantially equal to the width of said frame, and means rigidly securing the ends of said legs to the outer surface of said side walls of said frame to position said cross member above said frame and in a forward location relative to the center of gravity of said storage file with said cartridges disposed therein.

3. In a combination as defined in claim 1, and the forward edge of each of said cartridge separating walls being spaced rearward of the forward edge of the shelf thereof a distance no greater than the depth of said V-shaped slots.

4. In a combination as defined in claim 1, each of said shelves having a depending front wall of a height substantially that of the thickness of the average person's index finger, and each of said shelves having a depth less than the depth of said cartridges to expose the upper and lower front edges of said cartridges forwardly of said shelves sufficiently for a person's index finger and thumb of one hand to grasp said upper and lower front edges of a cartridge disposed upon said cartridge supporting surface with said cartridge engaging said back wall of said frame and to draw said cartridge from said shelf.

5. In a combination as defined in claim 4, and said cartridge supporting surfaces of each of said shelves being disposed upwardly at an angle to said back wall of said frame of less than ninety degrees and greater than eighty degrees.

6. In a combination as defined in claim 1, three additional storage files substantially identical to said storage file, a rectangular thin metal pan, means securing said four storage files in upstanding positions on said pan and arranged in a rectangular pattern with the shelves of each storage file facing outwardly of one of the sides of said rectangular pan, a thin metal rectangular plate of a peripheral size and shape substantially conforming to the peripheral size and shape of said pan, a section of substantially rigid tubing of a length less than the height of said storage files, means securing said tubing to said plate to upstand from the center thereof, said plate having a hole therethrough in axial alignment with said tubing, a plurality of fasteners securing said plate to the underside of said pan with said tubing within the open area defined by said storage files on said pan, a base member, a substantially rigid rod-like member of an outer diameter less than the inner diameter of said tubing, means securing said rod-like member to the upper surface of said base member to upstand therefrom, a thrust bearing, means for mounting said thrust bearing between the upper ends of said tubing and said rod-like member with said rod-like member telescopically within said tubing to rotatively carry said tubing on said upper end of said rod-like member with said plate spaced above said base member, and at least one sleeve bearing mounted about said rod-like member and engaging the inner wall of said tubing.

7. In a combination as defined in claim 6, said means for mounting said thrust bearing between the upper ends of said tubing and said rod-like member comprising a tubular section internally shouldered and supporting the outer race of said thrust bearing therewithin with the inner race of said thrust bearing extending above said rod-like member, a pin through the upper end of said tubing above and resting upon said inner race to rotatively carry said tubing on said rod-like member.

8. In a storage file for compactly storing a plurality of generally rectilinear box-like objects with said objects in upright rows of generally side-by-side engagement and in a vertical stack of a plurality of said rows, the improvement comprising a frame of a sheet of relatively thin rigid material formed as a rectilinear flat back wall with a pair of integral opposed rectangular side walls extending perpendicularly from the opposite vertical edges of said back wall, a plurality of substantially identical shelves for supporting said objects in said upright rows of generally side-by-side engagement, each of said shelves being formed from a rectangular sheet of relatively thin rigid material as a rectangular object supporting surface with integral opposed end walls and opposed front and back walls, said front wall depending from said object supporting surface and of a height substantially that of the thickness of an average person's index finger, a plurality of upwardly extending substantially parallel object separating walls integral with said rectangular object supporting surface, said separating walls arranged transversely of said rectangular object supporting surface and sapaced apart a distance slightly greater than the thickness of said object to provide a loose fit of said objects between adjacent separating walls, each of said separating walls having a height substantially less than said thickness of said objects, said opposed end walls of each of said shelves extending substantially perpendicularly from said rectangular object supporting surface, means for securing each of said back walls of each of said shelves to said back wall of said frame between said side walls thereof and in parallel alignment and a vertically stacked and spaced apart arrangement greater than the height of said objects by an amount sufficient only to permit one of said objects to be placed in an upstanding condition on said rectangular object supporting surface of one of said shelves and immediately below the lower edge of said front wall of said shelf thereabove without engaging said front wall of said shelf thereabove, means for securing each of said opposed end walls to said side walls of said frame, and each of said rectangular object supporting surfaces having a front-to-back dimension sufficiently less than the front-to-back dimension of the upper edge of one of said objects on one of said shelves with the rearward side of said object resting against said back wall of said frame to permit the index finger of a person to engage the upper forward edge of said object with the thumb of said hand engaging the lower forward edge of said object to permit said person to draw said object outwardly from said object supporting surface.

9. In a storage file as defined in claim 8, and said back wall of said frame and the underside of each of said shelves between the front and rear walls thereof being devoid of any substantial projections capable of engaging any part of said objects supported on said object supporting surfaces of said shelves.

10. In a storage file as defined in claim 8, and said means for securing each of said opposed end walls of said shelves to said side walls of said frame positioning said object supporting surface of each of said shelves downwardly toward said rear wall of said frame at an angle of less than ten degrees from the horizontal.

11. In a storage file as defined in claim 8, said means for securing each of said back walls of each of said shelves to said back wall of said frame and said means for securing each of said opposed end walls of said shelves to said side walls of said frame comprising said back wall and said side walls of said frame having rectangular tongues cut therefrom with the lower side of each of said tongues attached thereto and with said tongues extending upwardly and against the inner surfaces of said back wall and said opposed end walls of each of said shelves, said back wall and said opposed end walls of each of said shelves having a rectangular opening covered by one of said tongues, and each of said tongues having a detent formed therefrom and extending into said rectangular opening covered thereby.

* * * * *